US005219138A

United States Patent [19]

Shier et al.

[11] Patent Number: 5,219,138

[45] Date of Patent: Jun. 15, 1993

[54] MOUNTING BRACKET

[75] Inventors: Richard Kenneth Shier, Livonia; Juris Pruzinski, Oak Park, both of Mich.

[73] Assignee: General Motors Corporation, Detroit, Mich.

[21] Appl. No.: 773,337

[22] Filed: Oct. 8, 1991

[51] Int. Cl.$^5$ ........................................ F16M 11/00

[52] U.S. Cl. ........................ 248/222.1; 248/680; 248/231.2

[58] Field of Search ............ 248/225.1, 205.1, 220.2, 248/187, 680, 220.1, 231.2, 231.3, 316.2; 403/246, 337, 362, 381, 380

[56] References Cited

U.S. PATENT DOCUMENTS

| | | | |
|---|---|---|---|
| 732,389 | 6/1903 | Wheater | 403/381 X |
| 2,351,386 | 6/1944 | Zucker | 248/187 |
| 3,071,350 | 1/1963 | Opie | 248/222.1 X |
| 3,576,303 | 4/1971 | Matson | 248/222.1 X |
| 4,367,979 | 1/1983 | Milligan | 403/362 X |
| 4,570,887 | 2/1986 | Banister | 248/187 |
| 5,096,377 | 3/1992 | Catte et al. | 403/337 X |

OTHER PUBLICATIONS

*Car and Driver*, Mar. 1990, p. 27.
*Popular Science*, Oct. 1990, pp. 82-85.

*Primary Examiner*—Karen J. Chotkowski
*Attorney, Agent, or Firm*—Charles K. Veenstra

[57] ABSTRACT

A mounting bracket for use with a base member having a flat upper base surface and an elongate shoulder extending upward from the base surface. The shoulder has a V-shaped recess extending along its length. The base member also has a tapped bolt hole adjacent to the base surface. The mounting bracket comprises a bracket member having an upper surface adapted to support a component, a flat lower bracket surface and a footing adjoining the bracket surface, and a pilot hole. The footing is inserted into the V-shaped recess with the upper beveled surface mating with the upper side of the V-shaped recess and with the bracket surface mating with the base surface. A connecting bolt extends through the pilot hole into the bolt hole. Screwing of the connecting bolt into the bolt hole results in insertion of the footing further into the V-shaped recess with the mating between the upper beveled surface and the upper side of the V-shaped recess resulting in the bracket surface being urged against the base surface.

1 Claim, 2 Drawing Sheets

MOUNTING BRACKET

TECHNICAL FIELD

This invention relates to a mounting bracket for mounting accessories to an engine, and more particularly to a mounting bracket having a footing which is driven into a V-shaped recess formed in a shoulder of the engine block by a single bolt to secure the bracket to the engine block.

BRIEF DRAWING DESCRIPTION

In the drawings.

Corresponding reference characters indicate corresponding parts throughout the several views of the drawings.

DETAILED DESCRIPTION

Figure 1:
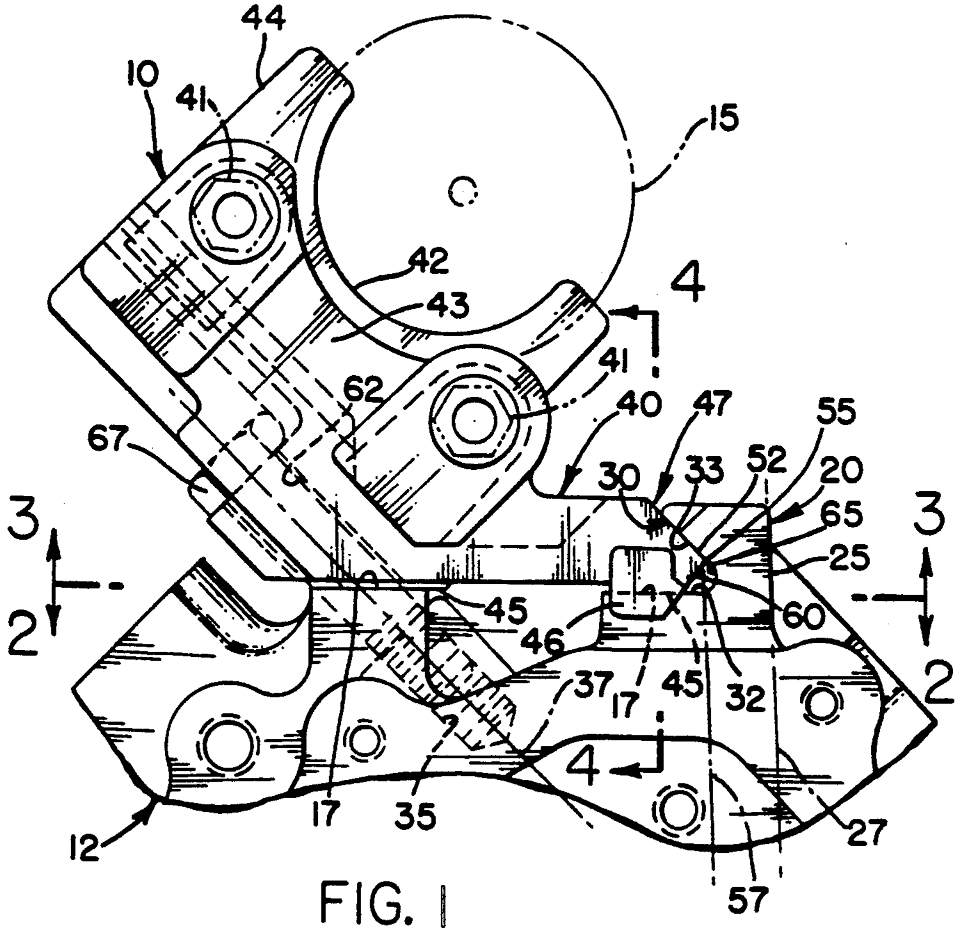
FIG. 1 is an elevational view of the mounting bracket of the present invention mounted on an engine.
Figure 2:
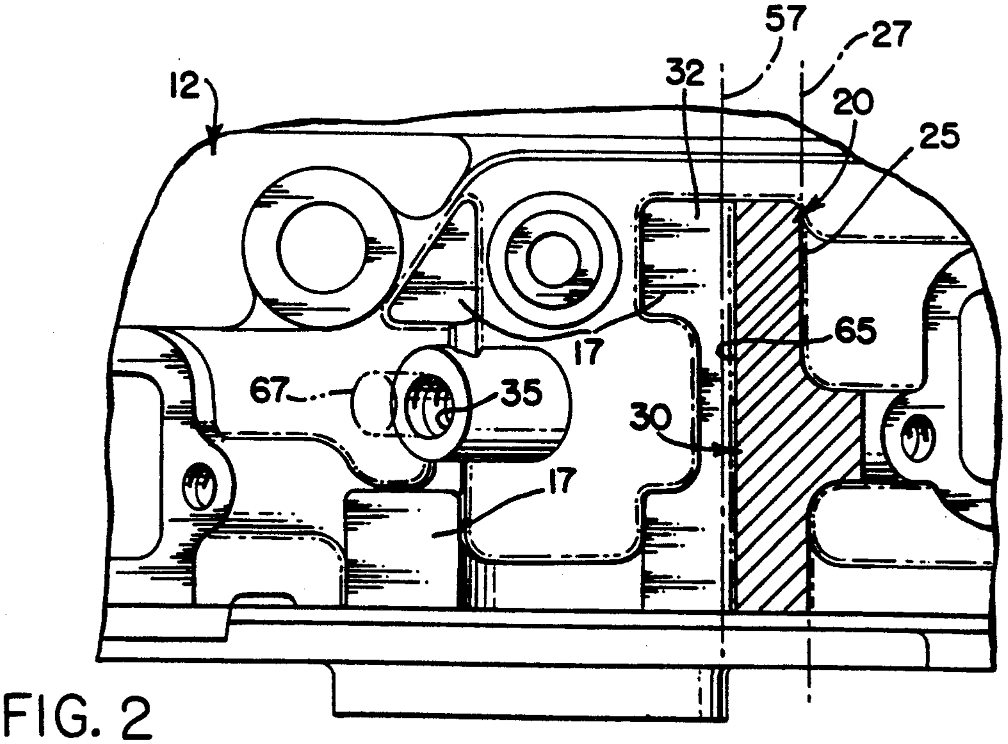
FIG. 2 is a plan view generally in the plane indicated by line 2—2 of FIG. 1 showing the base surfaces and shoulder of the engine.
Figure 3:
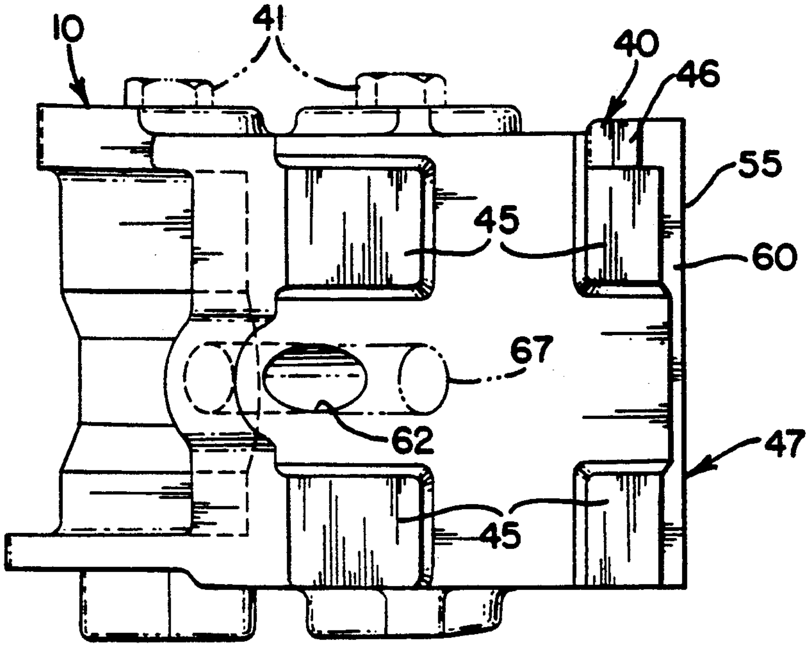
FIG. 3 is a plan view generally in the plane indicated by line 3—3 of FIG. 1 showing the bracket surfaces and lower beveled surface of the footing.
Figure 4:
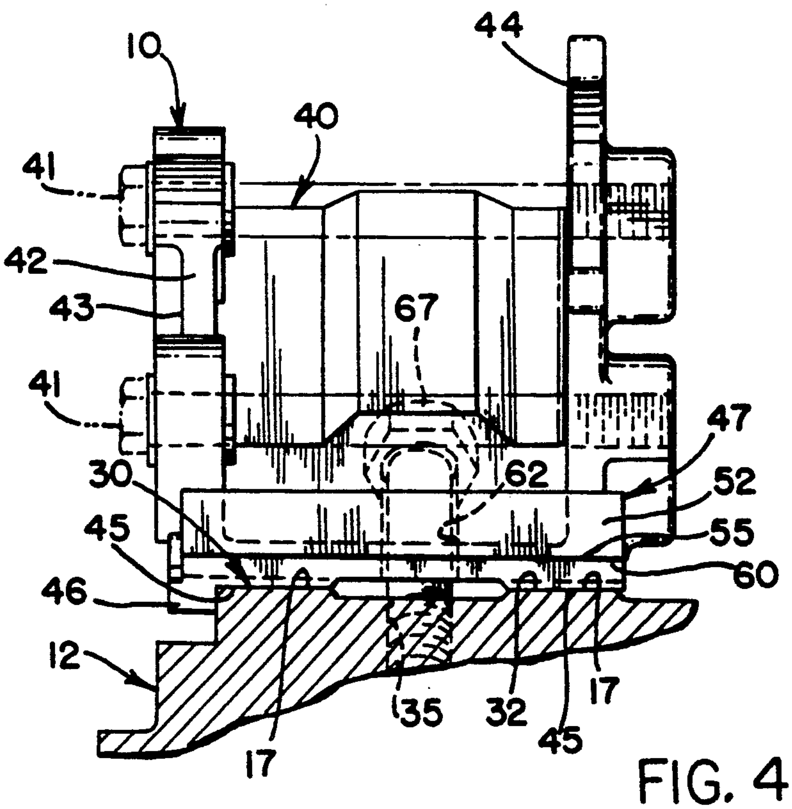
FIG. 4 is an elevational view generally in the plane indicated by line 4—4 showing the cylinder block in section and footing of the mounting bracket.

Referring to the drawings, and in particular, FIG. 1, numeral 10 generally refers to a mounting bracket for mounting a component on a base member 12. The mounting bracket 10 is particularly suited to mount a power steering fluid pump 15 on a base member 12 formed on the cylinder block of an engine, and will be described in connection therewith. The mounting bracket 10, however, can be used in a variety of other applications to securely attach components to base members supported on other structures.

The base member 12 is constituted by region of cylinder block having an upper base surface 17 comprising four sections machined into the cylinder block. The sections of the upper base surface 17 are machined in one pass by a machining tool resulting in each section precisely lying in a single plane. An elongate shoulder 20 extends upward from the base surface 17 so that one of the sides of the shoulder faces the base surface 17. The opposite side 25 of the shoulder 20 lies in a shoulder locating plane 27 which is perpendicular to the base surface 17. The side of the shoulder 20 which faces the base surface 17 has a V-shaped recess 30 machined into it. The V-shaped recess 30 extends along the length of the shoulder 20 with the lower side 32 of the V-shaped recess being parallel to the base surface 17. The upper side 33 of V-shaped recess forms an acute angle with the base surface 17.

The base member 12 has a tapped bolt hole 35 adjacent to the base surface 17. The tapped bolt hole 35 extends downward into the base member 12 toward the shoulder locating plane 27. The axis of the tapped bolt hole 35 lies in a plane which is perpendicular to and intersects the shoulder 20. The axis of the tapped bolt hole 35 forms a 45 degree angle with the shoulder locating plane 27.

The mounting bracket 10 comprises an aluminum bracket member 40 having an upper mounting surface 42. The upper mounting surface 42 includes an integral front mounting flange 43 extending upward from the front of the bracket member 40, and an integral rear mounting wall 44 extending upward from the rear of the bracket member, as shown in FIG. 1. The side of the rear mounting wall 44 which faces the front mounting flange 43 is not machined. The front mounting flange 43 has a pair of bores which are coaxial with a pair of bores in the rear mounting wall 44 enabling a pair of mounting bolts 41 to extend between the front mounting flange and rear mounting wall. The mounting bolts 41 are supported by sliding bushings which are mounted in the bores in the front mounting flange 43. The bores in the rear mounting wall 44 are tapped enabling the threaded ends of the mounting bolts to be screwed into them.

The mounting bracket 10 also has a lower bracket surface 45 comprising four sections machined into the bracket member 40. The sections of the lower bracket surface 45 are machined in one pass by the machining tool resulting in each section lying in a single plane. The plane of the lower bracket surface 45 forms an angle with the side of the rear mounting wall 44 which faces the front mounting flange 43, with the angle being between 89.5 and 90.5 degrees. A locating tab 46 depends from the bracket surface 45 and is perpendicular thereto.

The mounting bracket 10 has an integral footing 47 adjoining the bracket surface 45 with the length of the footing 47 being perpendicular to the locating tab 46. The footing 47 is above the plane of the bracket surface 45 and has an upper beveled surface 52 which forms an acute angle with the bracket surface 45. The upper beveled surface 52 slopes downward in a direction away from the bracket surface 45. The lower edge of the upper beveled surface 52 lies in a bracket locating plane 57 which is perpendicular to the bracket surface 45. The footing has a lower beveled surface 60 which adjoins the lower edge 55 of the upper beveled surface 52. The mounting bracket 10 has a pilot hole 62 cast into the bracket member 40, with the pilot hole 62 being adjacent to the bracket surface 45. The pilot hole 62 extends through the bracket member 40 in a downward direction toward the bracket locating plane 57. The axis of the pilot hole 62 forms a 45 degree angle with the bracket locating plane 57 and lies in a plane which is perpendicular to the bracket locating plane 57.

The angle between the upper beveled surface 52 and bracket surface 45 is approximately equal to the angle between the upper side 33 of the V-shaped recess 30 and the base surface 17. The angle between the axis of the pilot hole 62 and bracket locating plane 57 is approximately equal to the angle between the axis 37 of the bolt hole 35 and the shoulder locating plane 27. The dimension between the pilot hole 62 and bracket locating plane 57, in a perpendicular direction with respect to the bracket locating plane and in the plane of the bracket surface 45, is approximately equal to the dimension between the bolt hole 35 and the apex 65 of the V-shaped recess 30, in a perpendicular direction with respect to the shoulder locating plane 27 and in the plane of the base surface 17.

Before the mounting bracket 10 is assembled to the base member 12, the power steering pump and pulley, and power steering fluid reservoir are connected together to form a pump assembly. The pump assembly is attached to the upper mounting surface 42 by mounting bolts 41 so that the power steering pump adjoins the side of the rear mounting wall 44 which faces the front mounting flange 43. The upper mounting surface 42 can be adapted to support other engine accessories.

The mounting bracket 10 is assembled to the base member 12 by first inserting the footing 47 into the V-shaped recess 30 with the upper beveled surface 52 mating with the upper side 33 of the V-shaped recess and with the bracket surface 45 mating with the base surface 17. The mounting bracket 10 is further positioned so that the axis of the pilot hole 62 approximately coincides with the axis of the bolt hole 35. A connecting bolt 67 is inserted into and through the pilot hole 62 into the bolt hole 35. The connecting bolt 67 has threads which correspond to the threads in the bolt hole 35. The pilot hole 62 has a cross section which is larger than the cross section of the connecting bolt 67 enabling the connecting bolt to extend through the pilot hole 62 into the bolt hole 35 even if there is offset between the axes of the pilot and bolt holes.

Shortly after the threads of the connecting bolt 67 become enmeshed with the threads of the bolt hole 35, the locating tab 46 is pressed against the front face of the base member 12 to correctly align the mounting bracket 10 on the base member in a direction which is parallel to the length of the shoulder 20. The engagement of the locating tab 46 with the base member 12, combined with the insertion of the footing 47 into the V-shaped recess 30, enables the sections of the bracket surface 45 to accurately mate with the sections of the base surface 17 thereby reducing any offset and maximizing the contact area between the sections. Also, the power steering pump pulley is accurately positioned with respect to the base member 12 and cylinder block due to the predetermined spacing between the surface of the locating tab 46 which engages the front face of the base member 12 and the surface of the rear mounting wall 44 which faces the front mounting flange 43. This facilitates the correct alignment between the power steering pump pulley and the drive belt to increases drive belt life and reduce drive belt noise.

The connecting bolt 67 is tightened thereby driving it down into the bolt hole 35. This brings the axis of the pilot hole 62 closer to the axis of the bolt hole 35 thereby driving the footing 47 further into the V-shaped recess 30. The engagement between the upper beveled surface 52 and the inclined upper side 33 of the V-shaped recess 30 results in the footing 47 being driven downward. This, combined with the downward travel of the connecting bolt 67 into bolt hole 35, causes the sections of the bracket surface 45 to be forced downward against the sections of the base surface 17. The contact area resulting from the mating of the flat sections of the bracket surface 45 and base surface 17 equalizes the loads between the pairs of sections which mate with one another resulting in a strong, rigid, stable connection between the mounting bracket 10 and base member 12.

This clamping of the bracket member 40 against the base member 12 results in a frictional force which resists relative movement of the bracket member 40 with respect to the base member 12 in the planes of the sections of the base surface 17 and bracket surface 45. After a sufficiently large frictional force is established between the sections of the base surface 17 and bracket surface 45, the locating tab 46 need not be pressed against the front face of the base member 12 to maintain correct alignment between the mounting bracket 10 and base member 12.

The lower beveled surface 60 allows the footing 47 to travel into the V-shaped recess 30 until the lower edge 55 of the upper beveled surface 52 engages the V-shaped recess 30.

The use of a single connecting bolt 67 to connect the mounting bracket 10 to the base member 12 reduces the areas of the mounting bracket 10 to which access is required in order to securely attach the mounting bracket 10 to the base member 12. This enables the assembly of the pump assembly to the mounting bracket 10 before the mounting bracket is attached to the base member 12. This facilitates engine assembly since the number of separate parts required to be attached to the engine block is reduced.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. In combination with a base member having a base surface and an elongate shoulder extending upward from the base surface, wherein the side of the shoulder which faces the base surface member has a V-shaped recess with the upper boundary of the recess forming an acute angle with the plane of the base surface, the base member also having a tapped bolt hole extending into the base member, the axis of the bolt hole forming an acute angle with the base surface, a mounting bracket comprising:

a bracket member adapted to support a component, said bracket member having a lower bracket surface and a footing, said footing having an upper beveled surface which forms an acute angle with the plane of said lower bracket surface, said bracket member having a pilot hole extending through said bracket member, the axis of said pilot hole forming an acute angle with said lower bracket surface, the angle between said upper beveled surface and the plane of the lower bracket surface being approximately equal to the angle between the upper boundary of the V-shaped recess and the plane of the base surface, the angle between the axis of said pilot hole and said lower bracket surface being approximately equal to the angle between the axis of the bolt hole and the base surface, wherein said footing is inserted into said V-shaped recess with said upper beveled surface mating with the upper boundary of the said V-shaped recess and with said lower bracket surface mating with the base surface, and a connecting bolt extends through said pilot hole and is threaded into the bolt hole, said pilot hole having a cross section which is larger than the cross section of the connecting bolt enabling the connecting bolt to pull said footing into said V-shaped recess with said mating between said upper beveled surface and the upper boundary of said V-shaped recess resulting in said lower bracket surface being urged against said base surface.

* * * * *